United States Patent
Li et al.

(10) Patent No.: US 8,300,562 B2
(45) Date of Patent: Oct. 30, 2012

(54) METHOD, APPARATUS, AND SYSTEM FOR SENDING A STATUS REPORT

(75) Inventors: Xinjie Li, Guangdong (CN); Xiaoying Zhu, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 362 days.

(21) Appl. No.: 12/698,812

(22) Filed: Feb. 2, 2010

(65) Prior Publication Data
US 2010/0137011 A1    Jun. 3, 2010

Related U.S. Application Data

(63) Continuation of application No. PCT/CN2008/071512, filed on Jul. 1, 2008.

(30) Foreign Application Priority Data

Aug. 2, 2007  (CN) .......................... 2007 1 0138032

(51) Int. Cl.
*H04B 7/005* (2006.01)
(52) U.S. Cl. ...................................... 370/278
(58) Field of Classification Search ............... 370/278, 370/312, 351, 356, 401
See application file for complete search history.

(56) References Cited

U.S. PATENT DOCUMENTS
6,097,962 A    8/2000   Corriveau et al.
2007/0136592 A1    6/2007   Smith FOREIGN PATENT DOCUMENTS
CN    1809179 A    7/2006
EP    1650990 A1    10/2004
WO    WO 2004/049653 A1    6/2004

OTHER PUBLICATIONS

Extended European Search Report in corresponding European Application No. 08773074.3 (Nov. 15, 2010).
Written Opinion of the International Searching Authority in corresponding PCT Application No. PCT/CN2008/071512 (Oct. 23, 2008).
"Q730—ISDN user part supplementary services," Series Q: Switching and Signalling, Specifications of Signalling System No. 7—ISDN supplementary services, Dec. 1999, International Telecommunication Union, Geneva, Switzerland.
"Short Message Peer to Peer Protocol Specification," Oct. 12, 1999, Issue 1.2, Version 3.4, SMPP Developers Forum.

*Primary Examiner* — Man Phan
*Assistant Examiner* — Nourali Mansoury
(74) *Attorney, Agent, or Firm* — Leydig, Voit & Mayer, Ltd.

(57) ABSTRACT

A method, an apparatus, and a system for sending a status report are disclosed according to the present invention. The method includes receiving a short message sent by a sender; assigning a first ID to the short message; incorporating the first ID in the short message and sending the short message; receiving a first status report carrying a second ID and the first ID and generating a second status report based on the first ID; sending the second status report to the sender. For the short message which has not been delivered successfully by the Short Message Service Router (SMS Router) for the first time, the SMS Router may replace the second ID in the first status report with the first ID based on the relationship between the first ID and the second ID to obtain a second status report and send the second status report to a sender.

2 Claims, 5 Drawing Sheets

METHOD, APPARATUS, AND SYSTEM FOR SENDING A STATUS REPORT

CROSS-REFERENCE TO RELATED APPLICATIONS

This application is a continuation of International Application No. PCT/CN2008/071512, filed on Jul. 1, 2008, which claims priority to Chinese Patent Application No. 200710138032.8, filed on Aug. 2, 2007, both of which are hereby incorporated by reference in their entireties.

FIELD OF THE INVENTION

The present invention relates to the mobile communication field, and more specifically to a method, an apparatus, and a system for sending a status report from a Short Message Service Center (SMSC) to a Service Provider (SP).

BACKGROUND

According to statistics, in a short message network architecture, about 60% of the short messages can be delivered successfully at one time, and more and more short messages need to be stored and forwarded by the SMSC. This causes that the forwarding efficiency is decreased gradually. Based on this situation, a Short Message Service Router (SMS Router) is introduced for a first time delivery. The short messages are submitted to the SMS Router by the SP. The SMS Router delivers the short messages to cell phones. For the short messages that are not delivered successfully for the first time, which are about 30% of the submitted short messages, the SMS Router may forward these short messages to the SMSC for delivering again.

In practicing the present invention, it is discovered that the short message ID received when the SP submits the short message is assigned by the SMS Router. The short message ID in a status report sent to the SP, however, is assigned by the SMSC after the SMS Router forwards the submitted short message and the SMSC resends the short message. Therefore, the SP may discover that the short message ID received when the SP submits the short message does not match with the short message ID in the received status report.

SUMMARY

A method, an apparatus, and a system for sending a status report are provided in order to address the ID matching issue occurred when the SMSC sends a status report via the SMS Router.

A method for sending a status report is provided according to an embodiment of the present invention. The method includes: (1) receiving a short message sent by a sender, assigning a first ID to the short message, and incorporating the first ID in the short message and sending the short message; (2) receiving a first status report carrying a second ID and the first ID, and generating a second status report based on the first ID; and (3) sending the second status report to the sender.

Another method for sending a status report is provided according to an embodiment of the present invention. The method includes: (1) receiving a short message sent by a sender, assigning a first ID to the short message, and sending the short message; (2) receiving an acknowledgement carrying a second ID; (3) storing the relationship between the first ID and the second ID; (4) receiving a first status report carrying the second ID, and generating a second status report based on the relationship between the first ID and the second ID; and (5) sending the second status report to the sender.

Yet another method for sending a status report is provided according to an embodiment of the present invention. The method includes: (1) receiving a short message carrying a first ID, assigning a second ID to the short message, and storing the relationship between the first ID and the second ID; (2) delivering the short message to a receiver; (3) receiving a response message returned from the receiver; (4) generating a second status report based on the relationship between the first ID and the second ID; and (5) sending the second status report to the sender.

An SMS Router is provided according to an embodiment of the present invention. The SMS Router includes: (1) an assigning unit, configured to assign a first ID to a short message sent by a sender; (2) a delivering unit, configured to incorporate the first ID in the short message and send the short message; (3) a replacing unit, configured to replace the first ID in the first status report with the second ID to generate a second status report; and (4) a transmitting unit, configured to send the second status report to the sender.

Another SMS Router is provided according to an embodiment of the present invention. The SMS Router includes: (1) an assigning unit, configured to assign a first ID to a short message sent by a sender; (2) a delivering unit, configured to send the short message; (3) a receiving unit, configured to receive an acknowledgement carrying a second ID and a first status report; (4) a storing unit, configured to store the relationship between the first ID and the second ID for the short message; (5) a replacing unit, configured to replace the first ID in the first status report with the second ID to generate a second status report; and (6) a transmitting unit, configured to send the second status report to the sender.

A short message service center is provided according to an embodiment of the present invention. The short message service center includes: (1) an assigning unit, configured to assign a second ID to a short message carrying a first ID; (2) a downward unit, configured to send the short message to a receiver; (3) a storing unit, configured to store the relationship between the first ID and the second ID for the short message; (4) a reporting unit, configured to generate a second status report according to a response message returned from the receiver and the relationship; and (5) a transmitting unit, configured to send the second status report.

A system for sending a status report is also provided according to one embodiment of the present invention. The system includes: (1) a short message service center, configured to assign a second ID to a short message, deliver the short message to a receiver and generate a first status report, wherein the ID in the first status report is the second ID; and (2) an SMS Router, configured to assign a first ID to the short message, replace the second ID in the first status report with the first ID based on the relationship between the first ID and the second ID to generate a second status report and send the second status report to a sender.

According to the above technical solutions, for the short message which has not been delivered successfully by the SMS Router for the first time, the SMS Router may replace the second ID in the first status report with the first ID based on the relationship between the first ID and the second ID to obtain a second status report and finally send the second status report to a sender. Thus, the ID in the second status report is the first ID which is assigned by the SMS Router. The short message ID received when the sender initially submits the short message to the SMS Router is also assigned by the SMS Router. Therefore, the ID matching issue occurred when the SMSC sends the status report via the SMS Router can be addressed. Consequently, the sender may perform a series of operations such as charging, service accounting and service upgrade based on the second status report.

DETAILED DESCRIPTION

Detailed description is provided for the present invention in connection with the annexed drawings and specific embodiments. In the below embodiments, a first ID indicates an ID of a short message assigned by the SMS Router. A second ID indicates an ID of the same short message assigned by the SMSC. The SMS Router needs to send a second status report whose message ID field carries the first ID.

The relationship between the first ID and the second ID may be conveyed to the SMS Router by incorporating the first ID and the second ID in a first status report sent from the SMSC to the SMS Router. A message ID field in the first status report carries the second ID assigned by the SMSC. An extension filed in the first status report carries the first ID. The SMS Router may extract the first ID from the extension field in the first status report and replace the second ID in the message ID field in the first status report with the first ID to generate a second status report.

The relationship between the first ID and the second ID may be stored in the SMS Router. When the SMS Router receives the first status report from the SMSC, the message ID field in the first status report carries the second ID assigned by the SMSC. The SMS Router then replaces the second ID carried in the message ID field in the first status report with the first ID based on the relationship between the first ID and the second ID. The second status report is thereby obtained.

The relationship between the first ID and the second ID may also be stored in the SMSC. When the SMSC receives a response message from the receiver, the message ID in the response message carries the second ID. The SMSC may directly generate a second status report based on the relationship between the first ID and the second ID. In the second status report, the message ID field carries the first ID. Alternatively, a first status report may be generated first. In the first status report, the message ID field carries the second ID. Then, a second status report is generated by replacing the second ID carried in the message ID field with the first ID based on the relationship between the first ID and the second ID.

Thus, the first ID carried in the message ID field in the second status report is assigned by the SMS Router. The short message ID received when the sender initially submits the short message to the SMS Router is also assigned by the SMS Router. Therefore, the ID matching issue occurred when the SMSC sends the status report via the SMS Router can be addressed. Consequently, the sender may perform a series of operations such as charging, service accounting and service upgrade based on the second status report.

Figure 1:
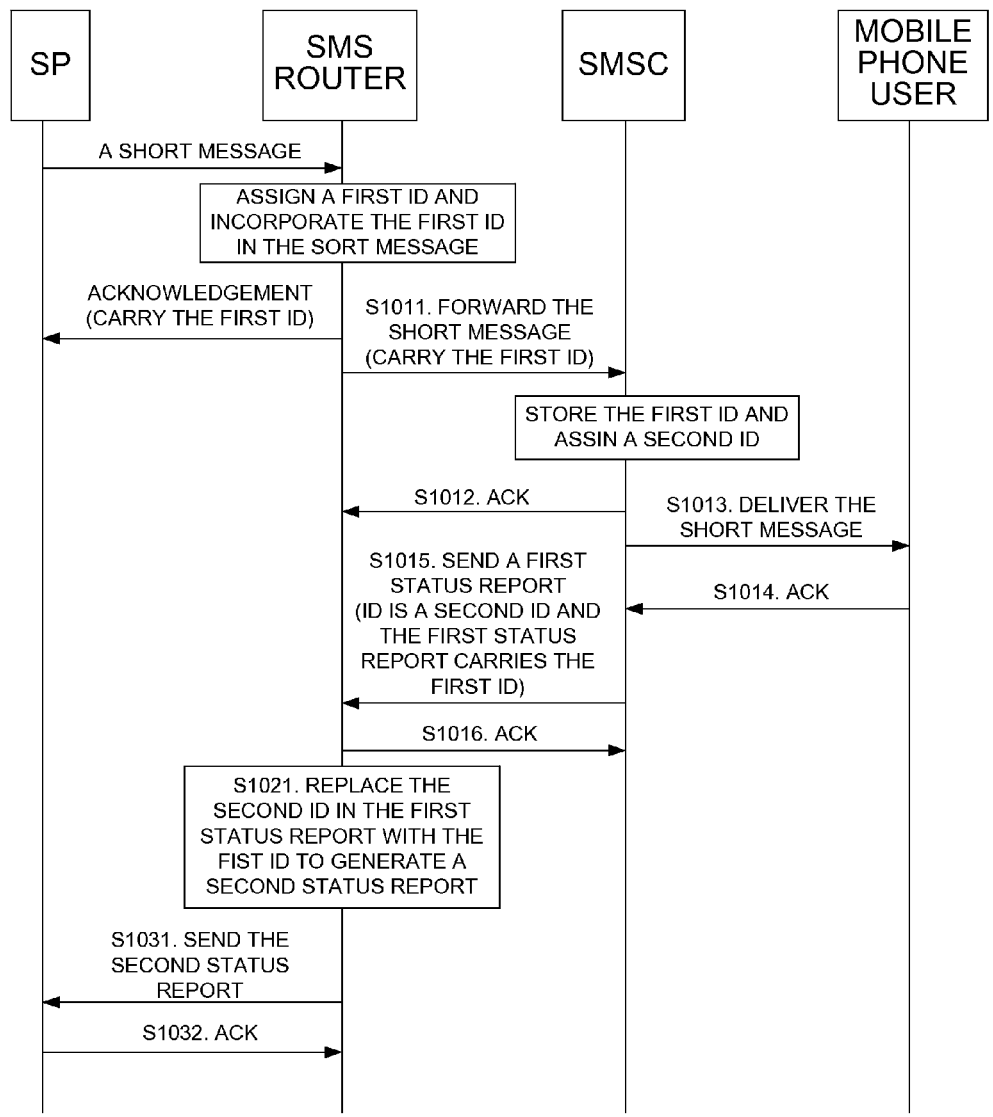
FIG. 1 is a flowchart of a method for sending a status report according to an embodiment of the present invention.

Referring to FIG. 1, a method for sending a status report according to an embodiment of the present invention includes the following steps.

The SMS Router receives a short message from a sender. The SMS Router assigns a first ID to the short message.

The SMS Router sends the sender an acknowledgement whose message ID field carries the first ID.

In this embodiment, the sender may be the SP.

S1011: The SMS Router forwards a short message to the SMSC. The short message carries a first ID.

Here, an extension field may be used for carrying the first ID in the short message. For example, an extension TLV field may be used for carrying the first ID.

The SMSC assigns a second ID to the short message.

After the SMSC receives the short message carrying the first ID, the SMSC assigns the second ID to the short message and stores the first ID. The first ID can be stored by storing the extension field as a property of the short message.

S1012: The SMSC sends a forward acknowledgement to the SMS Router.

Here, a message ID field in the forward acknowledgement carries the second ID.

S1013: The SMSC delivers the short message to a receiver.

In the present embodiment, the receiver may be a mobile terminal, a stationary terminal, a multimedia terminal, etc. The mobile terminal may be a cell phone, a PDA, etc.

S1014: The receiver sends a short message acknowledgement to the SMSC.

S1015: The SMSC sends a first status report to the SMS Router. The first status report carries the first ID and the second ID.

Here, the message ID field in the first status report carries the second ID assigned by the SMSC, while the extension field in the first status report carries the first ID. The message ID field is a field for identifying the ID of the message.

S1016: The SMS Router sends a status report acknowledgement to the SMSC.

S1021: The SMS Router extracts the first ID in the extension field in the first status report and replaces the second ID in the message ID field in the first status report with the first ID to generate a second status report.

S1031: The SMS Router sends a second status report to the sender.

S1032: The sender sends a status report acknowledgement to the SMS Router.

In the present embodiment, the first status report carries the relationship between the first ID and the second ID. Thus, the storage function does not need to be provided for the SMS Router which saves the storage cost for the SMS Router.

Figure 2:
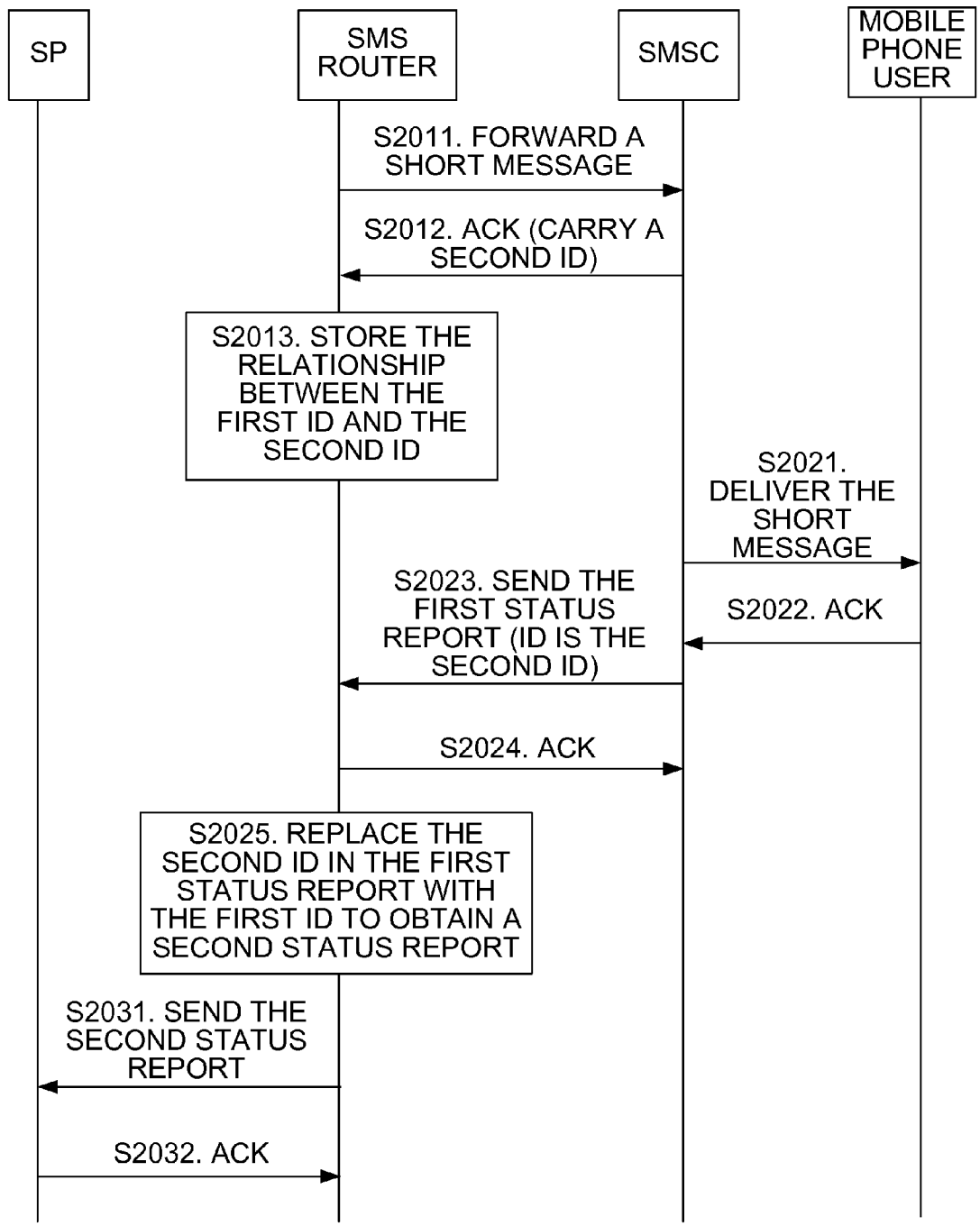
FIG. 2 is a flowchart of a method for sending a status report according to another embodiment of the present invention.

Referring to FIG. 2, a method for sending a status report according to an embodiment of the present invention includes the following steps.

The SMS Router assigns a first ID to a short message.

The first ID is used by the SMS Router for identifying the short message.

S2011: The SMS Router forwards the short message to the SMSC. The SMS Router stores the first ID.

The SMSC assigns a second ID to the short message.

The second ID is used by the SMSC for identifying the short message.

S2012: The SMSC sends a forward acknowledgement to the SMS Router. The forward acknowledgement carries the second ID.

Here, an extension field may be used for carrying the second ID in the forward acknowledgement. For example, an extension TLV field in the forward acknowledgement may be used for carrying the second ID.

S2013: The SMS Router stores the relationship between the first ID and the second ID.

S2021: The SMSC delivers the short message to a receiver.

S2022: The receiver sends a short message acknowledgement to the SMSC.

S2023: The SMSC sends a first status report to the SMS Router.

Here, the message ID field in the first status report carries the second ID.

S2024: The SMS Router sends a status report acknowledgement to the SMSC.

S2025: The SMS Router retrieves the relationship between the first ID and the second ID and replaces the second ID in the message ID field in the first status report with the first ID to generate a second status report.

S2031: The SMS Router sends the second status report to the sender.

S2032: The sender sends a status report acknowledgement to the SMS Router.

In the present embodiment, the SMS Router is provided with a caching function for storing the relationship between the first ID and the second ID.

In the present embodiment, since the SMS Router needs to store the relationship between the first ID and the second ID for a mass of short messages, in practice, the present embodiment may also include a step for deleting the relationship between the first ID and the second ID. As a result, the cache shortage problem that is caused by the case the SMS Router has to constantly store the relationship can be addressed.

If the SMS Router still has not received the first status report from the SMSC when the short message times out, the relationship between the first ID and the second ID may be deleted.

Alternatively, the relationship between the first ID and the second ID may be deleted after the SMS Router replaces, based on the relationship, the first ID in the message ID field in the first status report generated by the SMSC with the second ID to generate a second status report.

Figure 3:
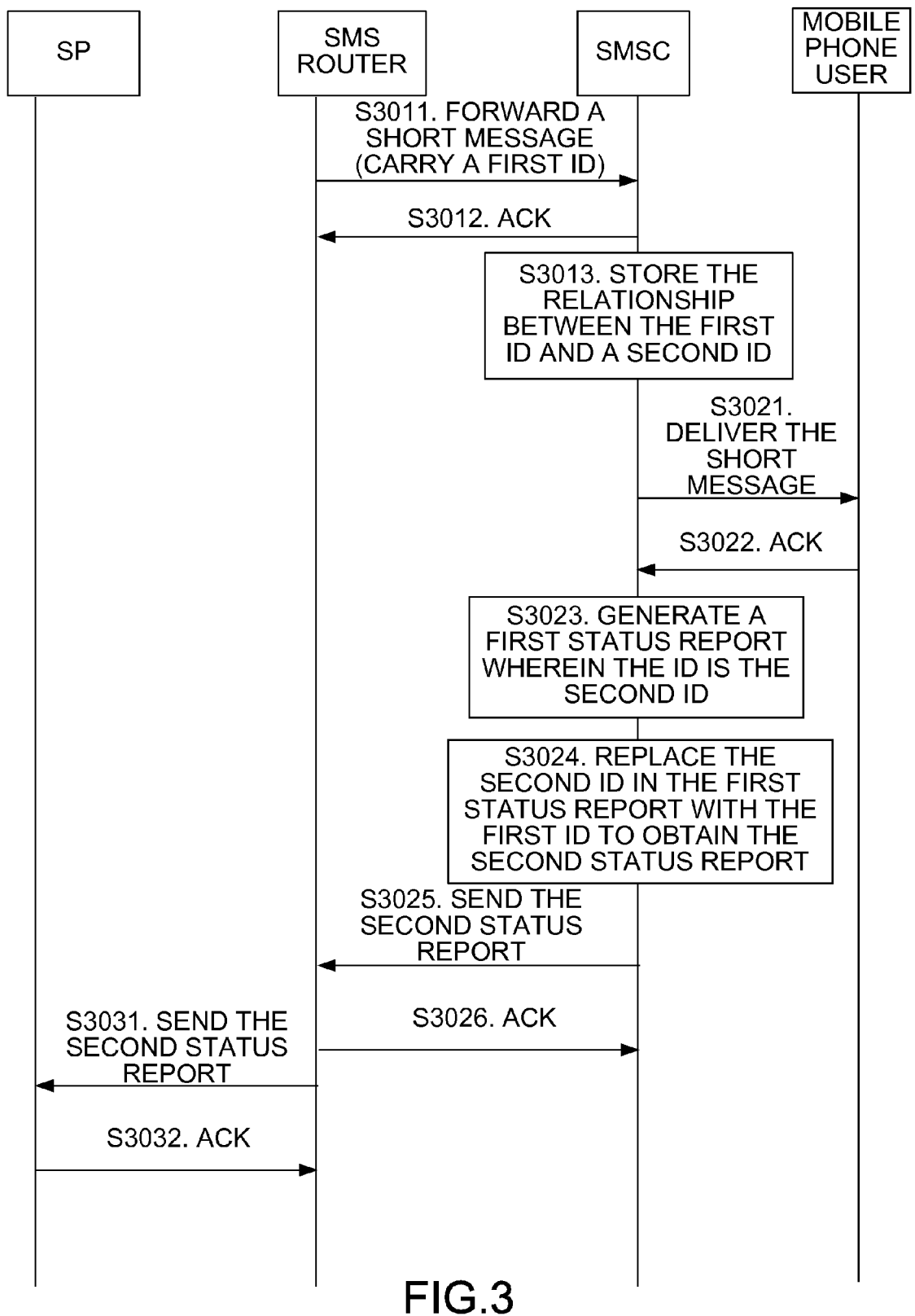
FIG. 3 is a flowchart of a method for sending a status report according to another embodiment of the present invention.

Referring to FIG. 3, a method for sending a status report according to an embodiment of the present invention includes the following steps.

The SMS Router assigns a first ID to a short message.

The first ID is used by the SMS Router for identifying the short message.

S3011: The SMS Router forwards the short message to the SMSC. The short message carries the first ID.

Here, an extension field may be used for carrying the first ID in the short message. For example, an extension TLV field may be used for carrying the first ID.

The SMSC assigns a second ID to the short message.

The second ID is used by the SMSC for identifying the short message.

S3012: The SMSC sends a forward acknowledgement to the SMS Router.

S3013: The SMSC stores the relationship between the first ID and the second ID.

S3021: The SMSC delivers the short message to a receiver.

S3022: The receiver sends a short message acknowledgement to the SMSC.

S3023: The SMSC generates a first status report. The message ID field in the first status report carries the second ID.

S3024: The SMSC retrieves the relationship between the first ID and the second ID and replaces the second ID in the message ID field in the first status report with the first ID to generate a second status report.

In S3023 and S3024, the second status report can also be generated directly based on the relationship between the first ID and the second ID after the SMSC receives the short message acknowledgement. The message ID field in the second status report carries the first ID.

S3025: The SMSC sends a second status report to the SMS Router.

S3026: The SMS Router sends a status report acknowledgement to the SMSC.

S3031: The SMS Router sends the second status report to the SP.

S3032: The SP sends a status report acknowledgement to the SMS Router.

In the present embodiment, the relationship between the first ID and the second ID is stored in the SMSC. The SMS Router does not have to be provided with the caching function, which saves the storage cost for the SMS Router. Moreover, after the SMSC replaces the ID in the first status report, the SMS Router may transparently sends the second status report to the SP.

Figure 4:
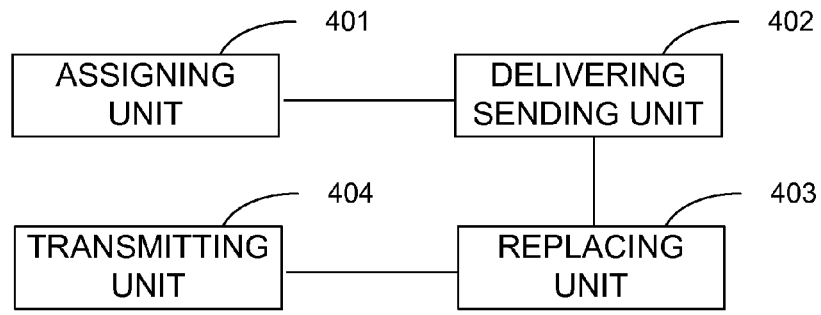
FIG. 4 is a block diagram of an SMS Router according to an embodiment of the present invention.

Referring to FIG. 4, an SMS Router includes: (1) assigning unit 401, configured to assign a first ID to a short message sent by a sender; (2) a delivering unit 402, configured to incorporate the first ID in the short message and send the short message; (3) a replacing unit 403, configured to replace a second ID in a first status report with the first ID to generate a second status report; and (4) a transmitting unit 404, configured to send the second status report to the sender.

In this embodiment, the SMS Router receives the first status report generated by the SMSC, replaces the second ID in the first status report with the first ID based on the relationship between the first ID and the second ID to generate the second status report, and sends the second status report to the SP. Thus, the message ID received when the SP submits the short message to the SMS Router is the first ID. If the SMS Router fails to deliver the short message for the first time, the SMS Router may submit the short message to the SMSC for delivering again. Ultimately, the short message ID in the second status report returned to the SP is also the first ID. Thus, the ID matching issue occurred when the SMSC sends the status report to the SP via the SMS Router can be addressed. The SP may perform a series of operations such as charging, service accounting and service upgrade based on the second status report.

Figure 5:
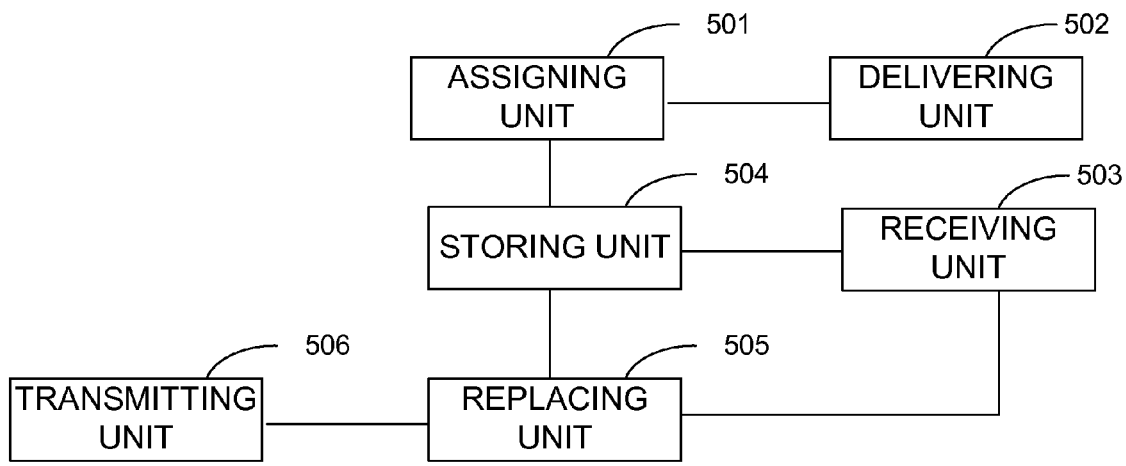
FIG. 5 is a block diagram of an SMS Router according to another embodiment of the present invention.

Referring to FIG. 5, an SMS Router includes: (1) an assigning unit 501, configured to assign a first ID to a short message sent by a sender; (2) a delivering unit 502, configured to send a short message; (3) a receiving unit 503, configured to receive an acknowledgement carrying a second ID and a first status report; (4) a storing unit 504, configured to store the relationship between the first ID and the second ID for the short message; (5) a replacing unit 505, configured to replace the second ID in the first status report with the first ID to generate a second status report; and (6) a transmitting unit 506, configured to send the second status report to the sender.

In the present embodiment, the storing unit for storing the relationship between the first ID and the second ID of the short message is provided in the SMS Router, which means that storage function is added to the SMS Router.

Figure 6:
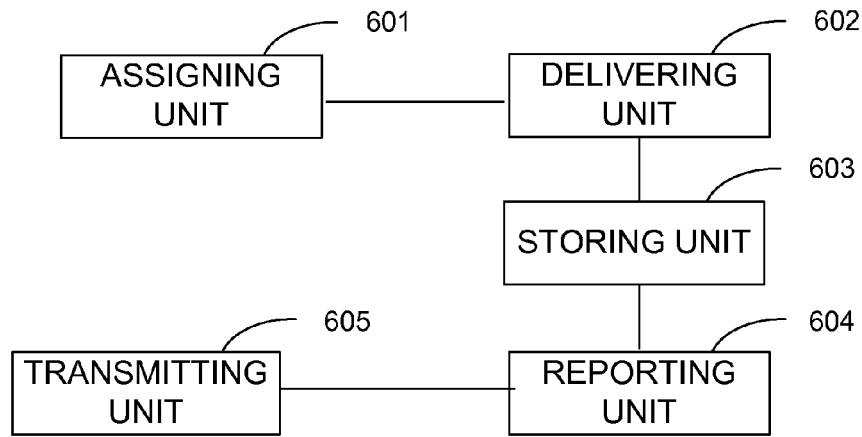
FIG. 6 is a block diagram of an SMSC according to an embodiment of the present invention.

Referring to FIG. 6, an SMSC includes: (1) an assigning unit 601, configured to assign a second ID to a short message carrying a first ID; (2) a delivering unit 602, configured to send the short message to a receiver; (3) a storing unit 603, configured to store the relationship between the first ID and the second ID of the short message; (4) a reporting unit 604, configured to generate a second status report according to a response message returned from the receiver and the relationship; and (5) a transmitting unit 605, configured to send the second status report.

A storing unit for storing the relationship between the first ID and the second ID of the short message is provided in the SMSC. The SMSC generates the second status report based on the response message and the relationship. Thus, the SMS Router only needs to perform the transparent transmission and does not need to extent the storage function, which saves the storage cost for the SMS Router. Consequently, the issue that the ID does not match when the SMSC sends the status report to the SP via the SMS Router can be addressed. The SP may perform a series of operations such as charging, service accounting and service upgrade based on the second status report.

The second status report may be directly generated by the SMSC with the first ID as its ID, or may be generated by generating a first status report with the second ID first and then replacing the ID in the first status report with the first ID.

Figure 7:
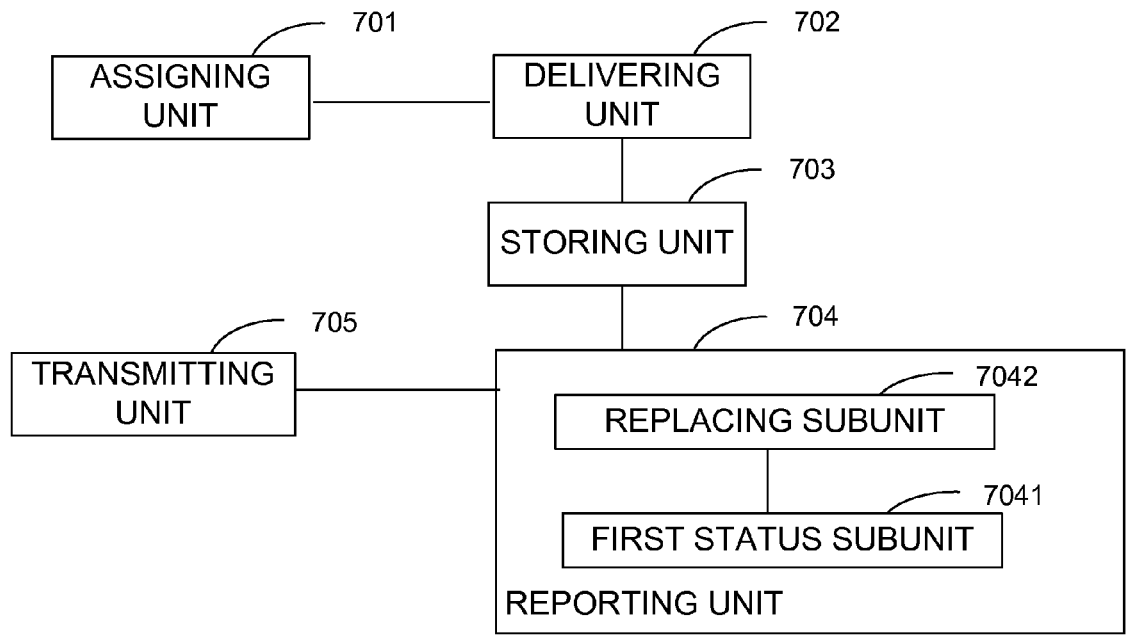
FIG. 7 is a block diagram of an SMSC according to another embodiment of the present invention.

Referring to FIG. 7, an SMSC includes an assigning unit 701, a delivering unit 702, a storing unit 703, a reporting unit 704 and a transmitting unit 705. The reporting unit 704 includes a first status subunit 7041 and a replacement subunit 7042.

The assigning unit 701 is configured to assign a second ID to a short message carrying a first ID.

The delivering unit 702 is configured to deliver the short message to a receiver.

The storing unit 703 is configured to store the relationship between the first ID and the second ID for the short message.

The first status subunit 7041 is configured to generate a first status report based on a response message returned by the receiver.

The replacement subunit 7042 is configured to replace the second ID in the first generated status report with the first ID to generate a second status report.

The transmitting unit 705 is configured to send the second status report.

A storing unit for storing the relationship between the first ID and the second ID for the short message is provided in the SMSC. The SMSC replaces the ID in the first status report and generates a second status report. Thus, the SMS Router only needs to perform the transparent transmission and does not need to extent the storage function, which saves the storage cost for the SMS Router. Consequently, the issue that the ID does not match when the SMSC sends the status report to the SP via the SMS Router can be addressed. The SP may perform a series of operations such as charging, service accounting and service upgrade based on the second status report.

A system for sending a status report is also provided according to an embodiment of the present invention. The system includes: (1) an SMSC, configured to assign a second ID to a short message, deliver the short message to a receiver and generate a first status report, wherein the message ID field in the first status report is the second ID; and (2) an SMS Router, configured to assign a first ID to the short message, replace the second ID in the first status report with the first ID based on the relationship between the first ID and the second ID to generate a second status report and send the second status report to a sender.

It is appreciated by those skilled in the art that the entire or partial steps described in the above embodiments can be implemented by associated hardware when instructed by program. The program may be stored in a computer readable storage medium. For instance, the program, when executed, performs the following steps: receiving a short message sent by the sender, assigning a first ID to the short message; incorporating the first ID in the short message and sending the short message, receiving a first status report carrying a second ID and the first ID, generating a second status report based on the first ID, and sending the second status report to the sender. The storage medium may be ROM/RAM, magnetic disc, optic disc, etc.

The foregoing embodiments are merely exemplary embodiments of the present invention. It should be noted that several modifications and variations can be made by those skilled in the art without departing from the principle of the present invention. These modifications and variations shall be construed as fall within the scope of the present invention.

The invention claimed is:

1. A method for sending a status report, comprising:
receiving, by a short message service router, a short message sent by a sender; assigning a first Identification (ID), which is used to uniquely identify the short message in the short message service router to the short message and incorporating the first ID in the short message;
sending the short message carrying the first ID to a short message service center;
storing, by the short message service center, the first ID after receiving the short message;
assigning, by the short message service center, a second ID, which is used to uniquely identify the short message in the short message service center, to the short message;
delivering, by the short message service center, the short message to a receiver; and
generating, by the short message service center, a first status report carrying the first ID and the second ID after the short message is delivered; wherein the second ID is carried in a message ID field of the first status report, the first ID is carried in an extension field of the first status report;
receiving, by the short message service router, the first status report carrying the second ID and the first ID;
generating, by the short message service router, a second status report by replacing the second ID in the message ID field with the first ID; and
sending by the short message service router the second status report to the sender.

2. A short message service center, comprising:
an assigning unit, configured to assign a second ID to a short message carrying a first ID; wherein the first ID is used to uniquely identify the short message in a short message service router and the second ID is used to uniquely identify the short message in the short message service center
a delivering unit, configured to send the short message to a receiver;
a storing unit, configured to store a relationship between the first ID and the second ID of the short message;
a reporting unit, configured to generate a second status report carrying the first ID according to a response message returned from the receiver and the relationship; and
a transmitting unit, configured to send the second status report;
wherein the reporting unit comprises:
a first status subunit, configured to generate a first status report based on the response message returned from the receiver; and
a replacement subunit, configured to replace the second ID in the first status report with the first ID to generate the second status report.

* * * * *